(12) United States Patent
Younis et al.

(10) Patent No.: US 9,768,646 B2
(45) Date of Patent: Sep. 19, 2017

(54) POWER HARVESTING CIRCUIT AND APPLICATIONS THEREOF

(71) Applicant: RFMicron, Inc., Austin, TX (US)

(72) Inventors: Ahmed Younis, San Antonio, TX (US); Shahriar Rokhsaz, Austin, TX (US)

(73) Assignee: RFMicron, Inc., Austin, TX (US)

( * ) Notice: Subject to any disclaimer, the term of this patent is extended or adjusted under 35 U.S.C. 154(b) by 0 days.

(21) Appl. No.: 15/358,961

(22) Filed: Nov. 22, 2016

(65) Prior Publication Data
US 2017/0077761 A1    Mar. 16, 2017

Related U.S. Application Data

(63) Continuation-in-part of application No. 15/154,510, filed on May 13, 2016, and a continuation-in-part of application No. 13/732,263, filed on Dec. 31, 2012.

(60) Provisional application No. 62/161,849, filed on May 14, 2015, provisional application No. 62/162,975, filed on May 18, 2015, provisional application No. 61/583,245, filed on Jan. 5, 2012.

(51) Int. Cl.
*H02M 7/06* (2006.01)
*H02J 50/20* (2016.01)
*H02M 1/00* (2006.01)

(52) U.S. Cl.
CPC ............... *H02J 50/20* (2016.02); *H02M 7/06* (2013.01); *H02M 2001/0006* (2013.01)

(58) Field of Classification Search
None
See application file for complete search history.

*Primary Examiner* — Jeffrey Gblende
(74) *Attorney, Agent, or Firm* — Garlick & Markison; Timothy W. Markison

(57) ABSTRACT

A power harvesting circuit a p-channel circuit, an n-channel circuit, an AC capacitance circuit, and an output capacitance circuit. The p-channel circuit includes a first diode element, a first diode voltage reduction circuit coupled to reduce a diode voltage of the first diode element, and a first start-up current circuit operably coupled to increase start-up current of the first diode element. The n-channel circuit includes a second diode element, a second diode voltage reduction circuit coupled to reduce a diode voltage of the second diode element, and a second start-up current circuit operably coupled to increase start-up current of the second diode element. The AC coupling capacitance circuit is coupled to the p-channel circuit and the n-channel circuit. The output capacitance circuit is coupled to the p-channel circuit and the n-channel circuit.

19 Claims, 5 Drawing Sheets

P-Channel circuit 72

N-Channel circuit 70 power harvesting 32

N-Channel circuit 70

P-Channel circuit 72 current boost 75

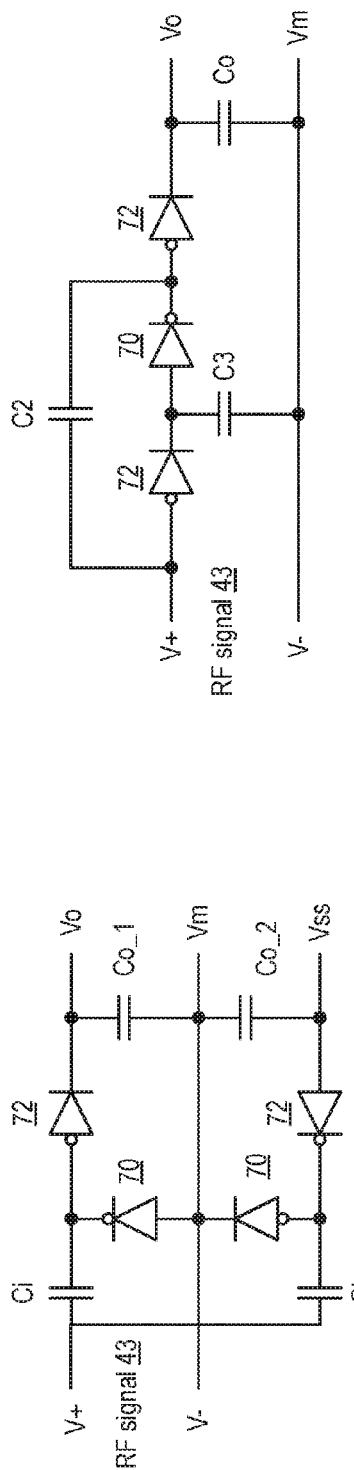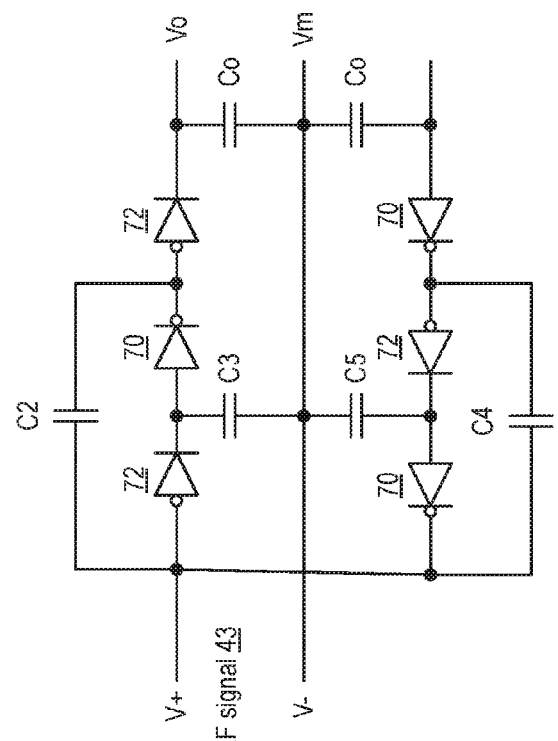
FIG. 10
power harvesting 32
FIG. 11
power harvesting 32
FIG. 12
power harvesting 32

POWER HARVESTING CIRCUIT AND APPLICATIONS THEREOF

CROSS REFERENCE TO RELATED PATENTS

The present U.S. Utility patent application claims priority pursuant to 35 U.S.C. §120 as a continuation-in-part of U.S. Utility application Ser. No. 15/154,510, entitled "POWER HARVESTING CIRCUIT AND APPLICATIONS THEREOF", filed May 13, 2016, which claims priority pursuant to 35 U.S.C. §119(e) to U.S. Provisional Application No. 62/161,849, entitled "METHOD AND APPARATUS FOR AC TO DC VOLTAGE CONVERSION", filed May 14, 2015, and U.S. Provisional Application No. 62/162,975, entitled "RFID TAGS AND SENSORS", filed May 18, 2015, all of which are hereby incorporated herein by reference in their entirety and made part of the present U.S. Utility patent application for all purposes.

U.S. Utility patent application Ser. No. 15/154,510 also claims priority pursuant to 35 U.S.C. §120 as a continuation-in-part of U.S. Utility application Ser. No. 13/732,263, entitled "AC-TO-DC CHARGE PUMP HAVING A CHARGE PUMP AND COMPLIMENTARY CHARGE PUMP", filed Dec. 31, 2012, which claims priority pursuant to 35 U.S.C. §119(e) to U.S. Provisional Application No. 61/583,245, entitled "METHOD AND APPARATUS FOR VARYING AN IMPEDANCE", filed Jan. 5, 2012, both of which are hereby incorporated herein by reference in their entirety and made part of the present U.S. Utility patent application for all purposes.

The present U.S. Utility patent application further claims priority pursuant to 35 U.S.C. §120 as a continuation-in-part of U.S. Utility application Ser. No. 13/732,263, entitled "AC-TO-DC CHARGE PUMP HAVING A CHARGE PUMP AND COMPLIMENTARY CHARGE PUMP", filed Dec. 31, 2012, which claims priority pursuant to 35 U.S.C. §119(e) to U.S. Provisional Application No. 61/583,245, entitled "METHOD AND APPARATUS FOR VARYING AN IMPEDANCE", filed Jan. 5, 2012, both of which are hereby incorporated herein by reference in their entirety and made part of the present U.S. Utility patent application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

Technical Field of the Invention

This invention relates generally to wireless communications more particularly to power harvesting.

Description of Related Art

Wireless communication systems are known to include wireless transceivers that communicate directly and/or over a wireless communication infrastructure. In direct wireless communications, a first wireless transceiver includes baseband processing circuitry and a transmitter to convert data into a wireless signal (e.g., radio frequency (RF), infrared (IR), ultrasound, near field communication (NFC), etc.). Via the transmitter, the first wireless transceiver transmits the wireless signal. When a second wireless transceiver is in range (e.g., is close enough to the first wireless transceiver to receive the wireless signal at a sufficient power level), it receives the wireless signal via a receiver and converts the signal into meaningful information (e.g., voice, data, video, audio, text, etc.) via baseband processing circuitry. The second wireless transceiver may wirelessly communicate back to the first wireless transceiver in a similar manner.

Examples of direct wireless communication (or point-to-point communication) include walkie-talkies, Bluetooth, ZigBee, Radio Frequency Identification (RFID), etc. As a more specific example, when the direct wireless communication is in accordance with RFID, the first wireless transceiver may be an RFID reader and the second wireless transceiver may be an RFID tag.

For wireless communication via a wireless communication infrastructure, a first wireless communication device transmits a wireless signal to a base station or access point, which conveys the signal to a wide area network (WAN) and/or to a local area network (LAN). The signal traverses the WAN and/or LAN to a second base station or access point that is connected to a second wireless communication device. The second base station or access point sends the signal to the second wireless communication device. Examples of wireless communication via an infrastructure include cellular telephone, IEEE 802.11, public safety systems, etc.

In many situations, direct wireless communication is used to gather information that is then communicated to a computer. For example, an RFID reader gathers information from RFID tags via direct wireless communication. At some later point in time (or substantially concurrently), the RFID reader downloads the gathered information to a computer via a direct wireless communication or via a wireless communication infrastructure.

In many RFID systems, the RFID tag is a passive component. As such, the RFID tag has to locally generate one or more supply voltages from the RF signals transmitted by the RFID reader. Accordingly, a passive RFID tag includes a power supply circuit that converts the RF signal (e.g., a continuous wave AC signal) into a DC power supply voltage. The power supply circuit includes one or more diodes and one or more capacitors. The diode(s) function to rectify the AC signal and the capacitor(s) filter the rectified signal to produce the DC power supply voltage.

The magnitude of the DC power supply voltage is a function of the peak voltage of the AC signal (Vpeak) and of the voltage drop of the diodes (Vdiode). For example, if one diode is used, the DC power supply voltage is approximately equal to Vpeak−Vdiode. The diode is a necessary component of the power supply circuit, but its voltage drop decreases the efficiency of the overall power supply circuit.

Techniques have developed to decrease the effective voltage drop of the diodes by using field effect transistors (FET) for the diodes and using voltage drop compensation circuits. For example, the compensation circuit includes a mirroring transistor of a smaller geometry coupled to the FET to reduce the "on" resistance and voltage of the FET, thereby effectively reducing its voltage drop and increasing the efficiency of the power supply circuit.

The voltage drop compensation circuits, however, only have a limited effect on increasing the efficiency of the power supply circuit since the compensation circuit requires a start up current to turn on the mirroring transistor. In addition, for the compensation circuit to start, the peak voltage of the AC signal needs to be at a high enough level to turn on the mirroring transistor. This requirement adds an element of delay in powering up a passive RFID tag.

BRIEF DESCRIPTION OF THE SEVERAL VIEWS OF THE DRAWING(S)

FIG. 10 is a schematic block diagram of another example embodiment of a power harvesting circuit in accordance with the present invention;

FIG. 11 is a schematic block diagram of another example embodiment of a power harvesting circuit in accordance with the present invention; and FIG. 12 is a schematic block diagram of another example embodiment of a power harvesting circuit in accordance with the present invention.

DETAILED DESCRIPTION OF THE INVENTION

Figure 1:
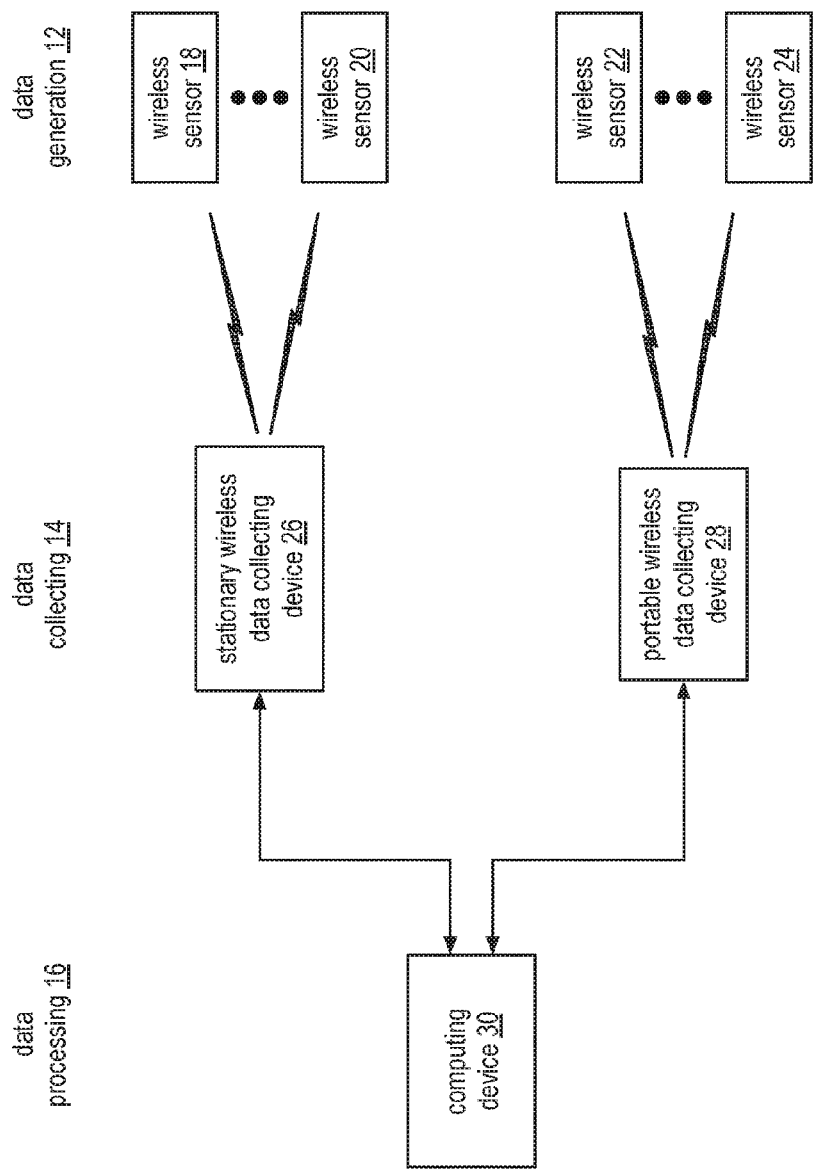
FIG. 1 is a schematic block diagram of an embodiment of a wireless communication system in accordance with the present invention.

FIG. 1 is a schematic block diagram of an embodiment of a wireless communication system 10 that includes three categories of devices: data generation 12, data collecting 14, and data processing 16. As shown, the data generation category 12 includes wireless sensors 18-24. The wireless sensors 18-24 may be implemented in a variety of ways to achieve a variety of data generation functions. For example, a wireless sensor includes a passive RFID topology and a sensing feature to sense one or more environmental conditions (e.g., moisture, temperature, pressure, humidity, altitude, sonic wave (e.g., sound), human contact, surface conditions, tracking, location, etc.) associated with an object (e.g., a box, a personal item (e.g., clothes, diapers, etc.), a pet, an automobile component, an article of manufacture, an item in transit, etc.). As another example, the wireless sensor includes an active RFID topology and a sensing feature. As yet another example, the wireless sensor includes processing circuitry and a transceiver for use with a personal area network (e.g., Bluetooth), a local area network (e.g., WiFi, local wireless area network), and/or a wide area network (e.g., cellular voice and/or data).

The data collecting category 14 includes stationary wireless collecting devices 26 and/or portable wireless data collecting devices 28. The construct of a wireless collecting device 26 and/or 28 is at least partially dependent on the data generation devices of category 12. For example, when a wireless sensor includes an RFID topology, the wireless data collecting device 26 and/or 28 is an RFID reader. As a specific example, the portable data collecting device 28 is a hand-held RFID reader and the stationary wireless collecting device 26 is a RFID reader mounted in a particular location (e.g., on an assembly line of a manufacturing process).

In general, the wireless sensors 18-24 generate data that is wirelessly communicated to the wireless data collecting devices 26 and/or 28. A wide variety of wireless communication protocols and/or standards may be used. For example, the wireless communication is in accordance with one or more RFID wireless communication standards and/or protocols. As another example, the wireless communication is in accordance with Bluetooth, ZigBee, IEEE 802.11, etc.

The data processing category 16 includes one or more computing devices 30. The computing device 30 may be a personal computer, a tablet computer, a laptop, a mainframe computer, and/or a server. The computing device 30 communicates with the wireless data collecting devices via a wired and/or wireless local area network, wide area network, or point-to-point network.

As an example, the wireless communication system 10 is deployed in a factory that assembles a product from multiple components in multiple stages occurring in multiple locations within the factory. Each of the components includes a wireless sensor that identifies the component and may further generate data regarding one or more environmental conditions of the component. In some locations within the factory, stationary wireless data collecting devices are positioned to communicate with the wireless sensors in its proximal area. In other locations of the factory, employees use the portable data collecting devices 28 to communicate with the wireless sensors in its proximal area.

As the wireless data collecting devices 26 and 28 communicate with the wireless sensors 18-24, they collect data from the sensors and relay the data to the computing device 30. The computing device processes the data to determine a variety of information regarding the assembly of the products, defects, efficiency, etc.

While the categories 12-16 of the wireless communication system are shown to have separate devices, a device may span multiple categories. For example, a data collecting device includes functionality to process at least some of the data it collects. As another example, a wireless sensor includes functionality to store and/or interpret the data it is collecting.

Figure 2:
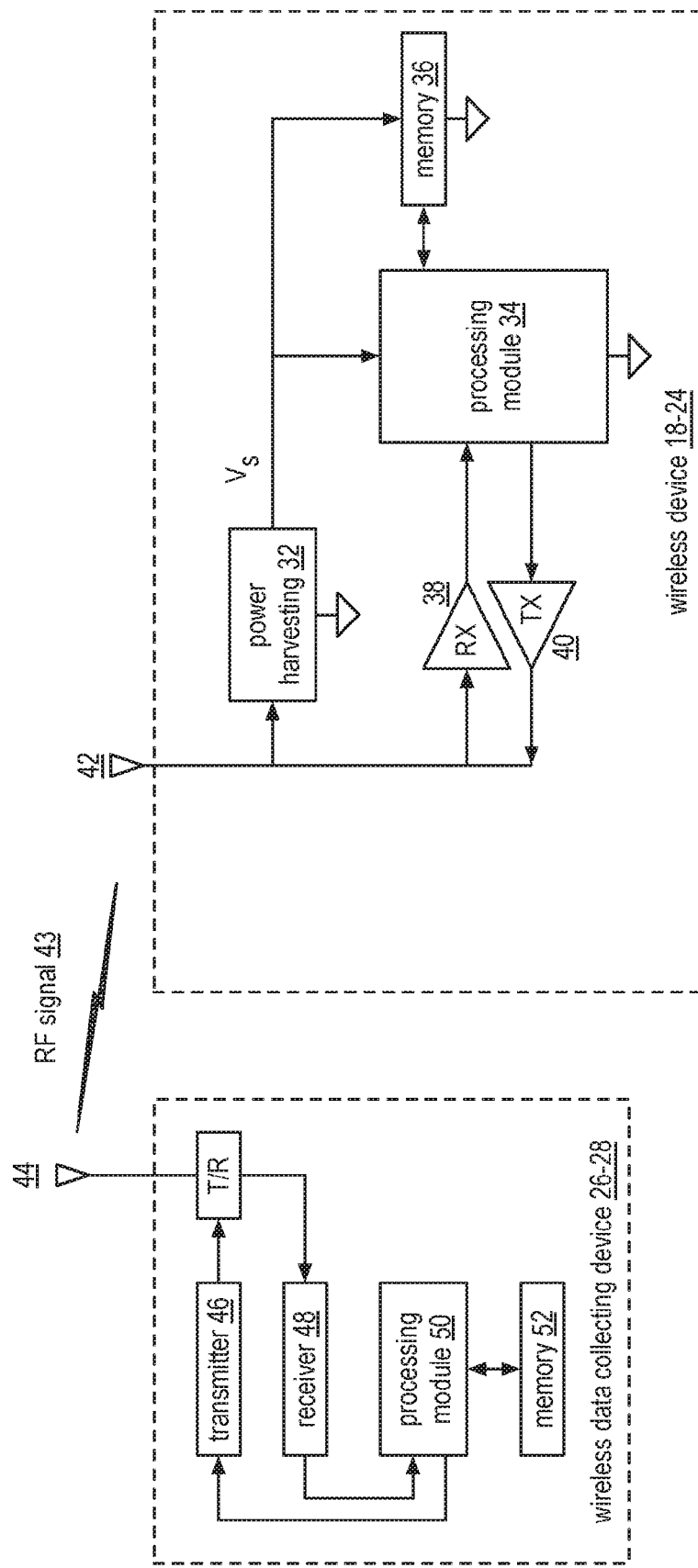
FIG. 2 is a schematic block diagram of an embodiment of a wireless data collecting device and a wireless device in accordance with the present invention.

FIG. 2 is a schematic block diagram of an embodiment of a wireless data collecting device 26-28 and a wireless device 18-24. The wireless device 18-24 includes a power harvesting circuit 32, a processing module 34, memory 36, a receiver section 38, a transmitter section 40, and an antenna structure 42. The wireless data collecting device includes an antenna structure 44, a transmitter 46, a receiver 48, a transmit/receive splitter or switch (T/R), a processing module 50, and memory 52.

In an example of operation, the wireless sensor is a passive RFID tag and the wireless data collecting device is an RFID reader. The passive RFID tag is associated with an object and an object identifier is stored in the memory 36 of the wireless device. For the RFID reader to communicate with the passive RFID tag, the tag first generates a power supply voltage (or multiple power supply voltages) from the RF (radio frequency) signal 43 transmitted from the RFID reader. For example, the RF signal 43 is a continuous wave signal and uses amplitude shift keying (ASK) or other amplitude-based modulation scheme to convey data.

The power harvesting circuit 32 receives the RF signal 43 via the antenna 42 and converts it into one or more supply voltages (Vs). The supply voltage(s) power the other components (e.g., 34-40) so that they perform their specific tasks. For instance, the receiver 38 is operable to convert an inbound message received from the RFID reader into a baseband signal that it provides to the processing module 34. The processing module 34 processes the baseband signal and, when appropriate, generates a response that is subsequently transmitted via the antenna 42 by the transmitter 40. For example, the inbound message instructs the wireless device to respond with the stored ID of the object associated with the wireless device. The power harvesting circuit 32 will be described in greater detail with reference to one or more of FIGS. 4-9.

Figure 3:
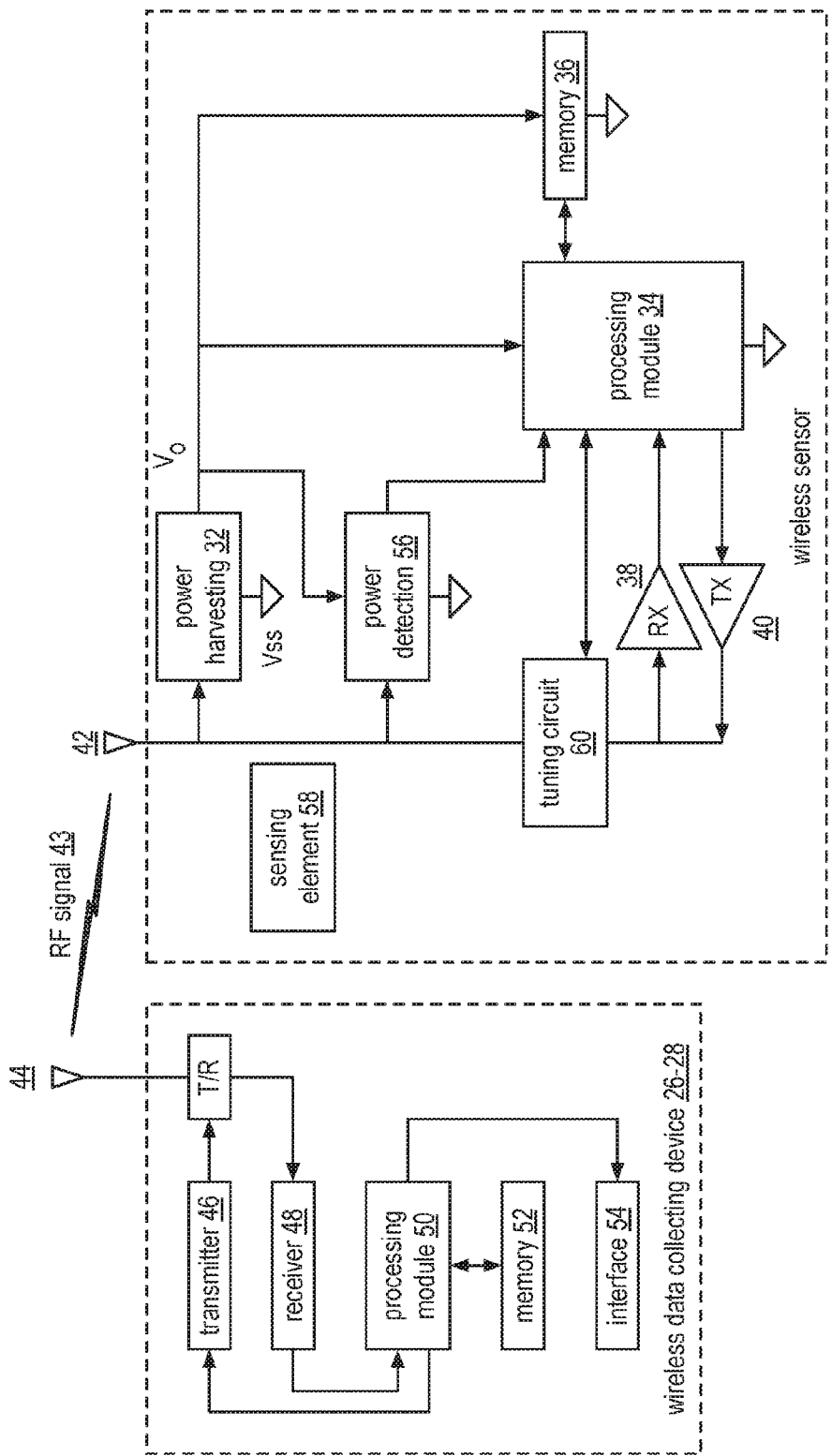
FIG. 3 is a schematic block diagram of another embodiment of a wireless data collecting device and a wireless sensor in accordance with the present invention.

FIG. 3 is a schematic block diagram of another embodiment of a wireless data collecting device 26-28 and a wireless device 18-24. The wireless device 18-24 includes a power harvesting circuit 32, a processing module 34, memory 36, a receiver section 38, a transmitter section 40, an antenna structure 42, a power detection circuit 56, a sensing element 58, and a tuning circuit 60. The wireless data collecting device includes an antenna structure 44, a transmitter 46, a receiver 48, a transmit/receive splitter or switch (T/R), a processing module 50, memory 52, and an interface 54. The interface 54 includes firmware (e.g., software and hardware) to communicate with the computing device 30 via a wired and/or wireless LAN and/or WAN.

In an example, the wireless device is a passive RFID tag used for sensing an environmental condition (e.g., moisture, temperature, pressure, humidity, altitude, sonic wave (e.g., sound), human contact, surface conditions, tracking, location, etc.) of an object (e.g., a box, a personal item (e.g., clothes, diapers, etc.), a pet, an automobile component, an article of manufacture, an item in transit, etc.). The sensing element 58 senses the environmental condition (e.g., moisture) and, as a result of the sensed condition, the sensing element affects the input impedance of the antenna structure 42 and/or of the tuning circuit 60 (e.g., a tank circuit that includes one or more capacitors and one or more inductors having a resonant frequency corresponding to the carrier frequency of the RF signal 43).

The processing module 34 adjusts the resonant frequency of the tuning circuit 60 to compensate for the change in input impedance caused by the sensed environmental condition. The amount of adjustment is reflective of the level of the environmental condition (e.g., a little change corresponds to a little moisture; a large change corresponds to a large amount of moisture). The processing module 34 conveys this information to the reader via the transmitter and the antenna 42.

Before the processing module processes the sensed environmental condition, it processes a power level adjustment. For example, the power detection circuit 56 detects a power level of the received RF signal 43. In one embodiment, the processing module interprets the power level and communicates with the RFID reader to adjust the power level of the RF signal 43 to a desired level (e.g., optimal for accuracy in detecting the environmental condition). In another embodiment, the processing module includes the received power level data with the environmental sensed data it sends to the RFID reader so that the reader can factor the power level into the determination of the extent of the environmental condition.

Figure 4:
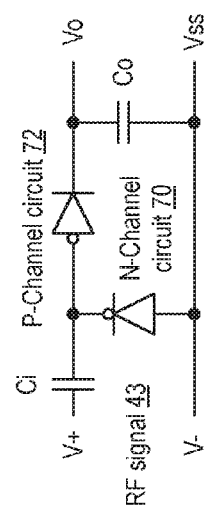
FIG. 4 is a schematic block diagram of an embodiment of a power harvesting circuit in accordance with the present invention.

FIG. 4 is a schematic block diagram of an embodiment of a power harvesting circuit 32 that includes a p-channel circuit 72, an n-channel circuit 70, an AC (or input) coupling capacitance circuit (Ci), and an output capacitance circuit (Co). Each of the capacitance circuits includes one or more of: one or more capacitors, one or more varactors, one or more transistors coupled as a capacitor, and any other device that provides a capacitance. One or more embodiments of the p-channel circuit 72 will be discussed with reference to one or more of FIGS. 6, 8, and 9. One or more embodiments of the n-channel circuit 70 will be described with reference to one or more of FIGS. 5 and 7.

In an example of operation, the power harvesting circuit 32 receives an RF signal 43. During each cycle of the RF signal 43, current is drawn through both the n and p channel circuits 70 and 72, charging the output capacitance (Co). As configured, the n and p channel circuits 70 and 72 are functioning as diodes. Accordingly, the output voltage is 2*(Vp−Vd), where Vp represents the peak voltage of the RF signal and Vd represents the forward diode voltage drop of the n and p channel circuits 70 and 72.

Figure 6:
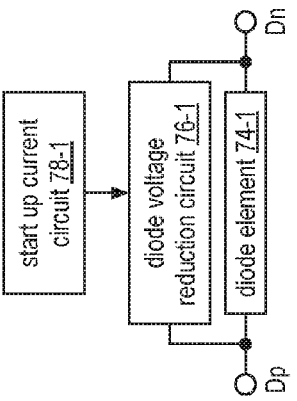
FIG. 6 is a schematic block diagram of an embodiment of a P-channel circuit in accordance with the present invention.
Figure 5:
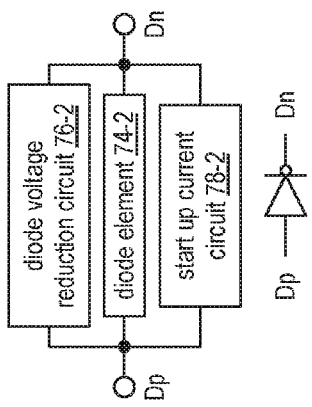
FIG. 5 is a schematic block diagram of an embodiment of an N-channel circuit in accordance with the present invention.

To reduce the forward diode voltage drop, which improves efficiency of the power harvesting circuit 32, the n-channel circuit 70 includes a diode voltage reduction circuit 76-2 and the p-channel circuit 72 includes a diode voltage reduction circuit 76-1, as shown in FIGS. 5 and 6, respectively.

To further improve the efficiency of the power harvesting circuit 32, the n-channel circuit 70 further includes a start-up current circuit 78-2 and the p-channel circuit 72 further includes a start-up current circuit 78-1, as shown in FIGS. 5 and 6, respectively. In general, the diode voltage reduction circuits 76-1 and 76-2 require a certain amount of current to turn on. Further, the diode voltage reduction circuits 76-1 and 76-2 require the received RF signal to be a certain magnitude to turn on. As such, when the current and/or the magnitude of the received RF signal are below the required levels, the diode voltage reduction circuits 76-1 and 76-2 are not operating properly, thereby limiting the efficiency of the power harvesting circuit.

Figure 7:
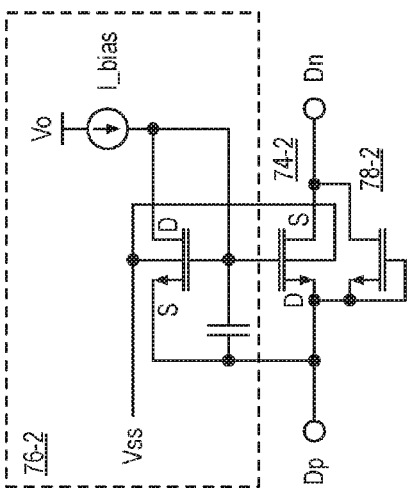
FIG. 7 is a schematic block diagram of another embodiment of an N-channel circuit in accordance with the present invention.

The inclusion of the start-up current circuit 78-1 and 78-2 substantially overcomes the limited efficiency of the power harvesting circuit 32 due to the current and/or the magnitude of the received RF signal being below the required levels. For example, and as shown in FIG. 7, the diode element 74-2 is implemented using a n-channel MOSFET (metal oxide semiconductor field effect transistor); the diode voltage reduction circuit 76-2 includes a biasing circuit; and the start-up current circuit 78-2 includes a native n-channel FET. The biasing circuit includes a mirroring n-channel transistor, a capacitor, and a current source coupled as shown.

When the power harvesting circuit 32 is first enabled, the native n-channel FET (i.e., the start-up current circuit 78-2) is turned on (e.g., gate-source voltage of 0 allows the FET to be on) before the biasing circuit is active. As such, at start up, the native n-channel FET is on, thereby providing a diode function until the n-channel MOSFET is turned on. As the magnitude of the received RF signal increases, supply more current to the diode voltage reduction circuit 76-2 turns on providing a gate-source voltage to the n-channel MOSFET. The gate-source voltage turns on the n-channel MOSFET and holds its forward voltage drop at desired level (e.g., below a level that is achievable without the biasing circuit). In this manner, the desired forward voltage drop is obtained at the start-up of the power harvesting circuit 32 with negligible delays and improved efficiency.

Figure 8:
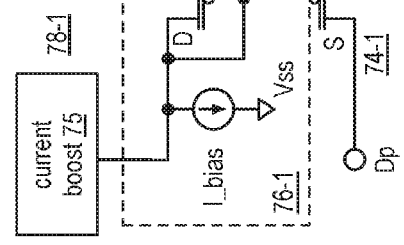
FIG. 8 is a schematic block diagram of another embodiment of a P-channel circuit in accordance with the present invention.
Figure 9:
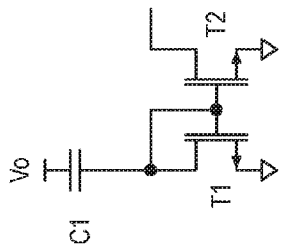
FIG. 9 is a schematic block diagram of an embodiment of a current boost circuit in accordance with the present invention.

FIG. 8 is a schematic block diagram of another embodiment of a P-channel circuit 72 that includes a p-channel MOSFET as the diode element 74-1, includes a biasing circuit for the diode voltage reduction circuit 76-1, and includes a current boost circuit 75 as the start-up current circuit 78-1. The biasing circuit includes a mirroring p-channel transistor, a capacitor, and a current source coupled as shown. The current boost circuit includes, as shown in FIG. 9, a pair of transistors T1 and T2, and a capacitor C1 coupled as shown.

Returning to the discussion of FIG. 8, when the power harvesting circuit 32 is first turned on, the current boost circuit 75 pulls the gate-source bias voltage low, thereby turning on the p-channel MOSFET. As the magnitude of the power supply voltage increases, the diode voltage reduction circuit 76-1 turns on and takes over providing the gate-source voltage to the p-channel MOSFET. The gate-source voltage holds the forward voltage drop of the p-channel MOSFET at desired level (e.g., below a level that is achievable without the biasing circuit). In this manner, the desired forward voltage drop is obtained at the start-up of the power harvesting circuit 32 with negligible delays and improved efficiency.

FIG. 10 is a schematic block diagram of another example embodiment of a power harvesting circuit 32 that includes two n-channel circuits 70, two p-channel circuits 72, two capacitance circuits (Ci), and two output capacitance circuits (Co). In this configuration, the power harvesting circuit 32 creates two voltages in a similar manner as the power harvesting circuit of FIG. 4 created one voltage. The first voltage is created by the upper half of the power harvesting circuit across Co_1 and the second voltage is created by the lower half of the power harvesting circuit across Co_2. A further discussion of this power harvesting circuit is provided in the parent patent application having a U.S. Utility application Ser. No. 13/732,263, entitled "AC-TO-DC CHARGE PUMP HAVING A CHARGE PUMP AND COMPLIMENTARY CHARGE PUMP", and filed on Dec. 31, 2012.

FIG. 11 is a schematic block diagram of another example embodiment of a power harvesting circuit 32 that includes an n-channel circuit 70, two p-channel circuits 72, a first capacitance circuit (C2), a second capacitance circuit (C3) and a third capacitance circuit (Co). Each of the capacitance circuits includes one or more of: one or more capacitors, one or more varactors, and/or one or more transistors configured to function as a capacitor.

Each of the p-channel circuits include a first diode element, a first diode voltage reduction circuit coupled to reduce a diode voltage of the first diode element, and a first start-up current circuit operably coupled to increase start-up current of the first diode element as previously discussed. The n-channel circuit includes a second diode element, a second diode voltage reduction circuit coupled to reduce a diode voltage of the second diode element, and a second start-up current circuit operably coupled to increase start-up current of the second diode element as previously discussed.

As shown, the first capacitance circuit (C2) is coupled to a first leg of a received radio frequency (RF) signal and to the first p-channel circuit. The first p-channel circuit is further coupled to the second capacitor circuit (C3) and to the n-channel circuit. The n-channel circuit is further coupled to the first capacitance circuit (C2) and to the second p-channel circuit. The second p-channel circuit is further coupled to the third capacitance circuit (Co) to provide an output voltage and the second and third capacitance circuits are further coupled to a second leg of the RF signal.

FIG. 12 is a schematic block diagram of another example embodiment of a power harvesting circuit 32 that includes the power harvesting circuit of FIG. 11 and a complimentary power harvesting circuit. The power harvesting circuits of FIGS. 11 and 12 are further discussion of this power harvesting circuit is provided in the parent patent application having a U.S. Utility application Ser. No. 13/732,263, entitled "AC-TO-DC CHARGE PUMP HAVING A CHARGE PUMP AND COMPLIMENTARY CHARGE PUMP", and filed on Dec. 31, 2012.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more of its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A power harvesting circuit comprises:
   a p-channel circuit that includes:
      a first diode element;
      a first diode voltage reduction circuit coupled to reduce a diode voltage of the first diode element; and
      a first start-up current circuit operably coupled to increase start-up current of the first diode element;
   a n-channel circuit that includes:
      a second diode element;
      a second diode voltage reduction circuit coupled to reduce a diode voltage of the second diode element; and a second start-up current circuit operably coupled to increase start-up current of the second diode element;

an alternating current (AC) coupling capacitance circuit coupled to the p-channel circuit and the n-channel circuit; and an output capacitance circuit coupled to the p-channel circuit and the n-channel circuit, wherein the p-channel circuit and the n-channel circuit rectify a received radio frequency (RF) signal to produce a rectified signal and the output capacitance circuit filters the rectified signal to produce a direct current (DC) output.

2. The power harvesting circuit of claim 1 further comprises:

the first diode element including a p-channel MOSFET (metal oxide semiconductor field effect transistor); and the second diode element including an n-channel MOSFET.

3. The power harvesting circuit of claim 1 further comprises:

the first diode element including a p-channel MOSFET (metal oxide semiconductor field effect transistor); and the first diode voltage reduction circuit including:
a current source;
a biasing transistor; and
a capacitor, wherein a gate of the biasing transistor is couple to a gate of the p-channel MOSFET, to a first plate of the capacitor, to a first node of the current source, and to a drain of the biasing transistor, wherein a source of the bias transistor is coupled to a drain of the p-channel MOSFET and to a second plate of the capacitor, wherein a second node of the current source is coupled to a common reference voltage, and wherein the biasing transistor is a p-channel transistor.

4. The power harvesting circuit of claim 1 further comprises:

the second diode element including a n-channel MOSFET (metal oxide semiconductor field effect transistor); and the second diode voltage reduction circuit including:
a current source;
a biasing transistor; and
a capacitor, wherein a gate of the biasing transistor is couple to a gate of the n-channel MOSFET, to a first plate of the capacitor, to a first node of the current source, and to a drain of the biasing transistor, wherein a source of the bias transistor is coupled to a drain of the n-channel MOSFET and to a second plate of the capacitor, wherein a second node of the current source is coupled to a power supply voltage, and wherein the biasing transistor is an n-channel transistor.

5. The power harvesting circuit of claim 1 further comprises:

the first start-up current circuit includes a current boost circuit coupled to the first diode voltage reduction circuit; and the second start-up current circuit includes a native metal oxide semiconductor field effect transistor (MOSFET) coupled to the second diode element.

6. The power harvesting circuit of claim 5, wherein the current boost circuit comprises:
a first transistor;
a second transistor; and
a capacitor, wherein gates of the first and second transistors are coupled together, to a first plate of the capacitor, and to a drain of the first transistor, wherein sources of the first and second transistors are coupled to a common reference voltage, wherein a second plate of the capacitor is coupled to a power supply voltage, and wherein a drain of the second transistor is coupled to the first diode voltage reduction circuit.

7. The power harvesting circuit of claim 1 comprises:
a second p-channel circuit that includes:
a third diode element;
a third diode voltage reduction circuit coupled to reduce a diode voltage of the third diode element; and
a third start-up current circuit operably coupled to increase start-up current of the third diode element;

a second n-channel circuit that includes:
a fourth diode element;
a fourth diode voltage reduction circuit coupled to reduce a diode voltage of the fourth diode element; and
a fourth start-up current circuit operably coupled to increase start-up current of the fourth diode element; and a second AC coupling capacitance circuit coupled to the second p-channel circuit and the second n-channel circuit; and a second output capacitance circuit coupled to the second p-channel circuit and the second n-channel circuit, wherein the second p-channel circuit and the second n-channel circuit rectify the received RF signal to produce a second rectified signal and the output capacitance circuit filters the rectified signal to produce a second DC output.

8. A power harvesting circuit comprises:
a first p-channel circuit that includes:
a first diode element;
a first diode voltage reduction circuit coupled to reduce a diode voltage of the first diode element; and
a first start-up current circuit operably coupled to increase start-up current of the first diode element;

a n-channel circuit that includes:
a second diode element;
a second diode voltage reduction circuit coupled to reduce a diode voltage of the second diode element; and
a second start-up current circuit operably coupled to increase start-up current of the second diode element;

a second p-channel circuit that includes:
a third diode element;
a third diode voltage reduction circuit coupled to reduce a diode voltage of the third diode element; and
a third start-up current circuit operably coupled to increase start-up current of the third diode element;

a first capacitance circuit;
a second capacitance circuit; and
a third capacitance circuit, wherein the first capacitance circuit is coupled to a first leg of a received radio frequency (RF) signal and to the first p-channel circuit, wherein the first p-channel circuit is further coupled to the second capacitor circuit and to the n-channel circuit, wherein the n-channel circuit is further coupled to the first capacitance circuit and to the second p-channel circuit, wherein the second p-channel circuit is further coupled to the third capacitance circuit to provide an output voltage, and wherein the second and third capacitance circuits are further coupled to a second leg of the RF signal.

9. The power harvesting circuit of claim 8 further comprises:
the first diode element including a first p-channel MOSFET (metal oxide semiconductor field effect transistor);
the second diode element including an n-channel MOSFET; and
the third diode element including a second p-channel MOSFET.

10. The power harvesting circuit of claim 8 further comprises:
the first diode element including a p-channel MOSFET (metal oxide semiconductor field effect transistor); and
the first diode voltage reduction circuit including:
a current source;
a biasing transistor; and
a capacitor, wherein a gate of the biasing transistor is couple to a gate of the p-channel MOSFET, to a first plate of the capacitor, to a first node of the current source, and to a drain of the biasing transistor, wherein a source of the bias transistor is coupled to a drain of the p-channel MOSFET and to a second plate of the capacitor, wherein a second node of the current source is coupled to a common reference voltage, and wherein the biasing transistor is a p-channel transistor.

11. The power harvesting circuit of claim 8 further comprises:
the second diode element including a n-channel MOSFET (metal oxide semiconductor field effect transistor); and
the second diode voltage reduction circuit including:
a current source;
a biasing transistor; and
a capacitor, wherein a gate of the biasing transistor is couple to a gate of the n-channel MOSFET, to a first plate of the capacitor, to a first node of the current source, and to a drain of the biasing transistor, wherein a source of the bias transistor is coupled to a drain of the n-channel MOSFET and to a second plate of the capacitor, wherein a second node of the current source is coupled to a power supply voltage, and wherein the biasing transistor is an n-channel transistor.

12. The power harvesting circuit of claim 8 further comprises:
the third diode element including a p-channel MOSFET (metal oxide semiconductor field effect transistor); and
the third diode voltage reduction circuit including:
a current source;
a biasing transistor; and
a capacitor, wherein a gate of the biasing transistor is couple to a gate of the p-channel MOSFET, to a first plate of the capacitor, to a first node of the current source, and to a drain of the biasing transistor, wherein a source of the bias transistor is coupled to a source of the p-channel MOSFET and to a second plate of the capacitor, wherein a second node of the current source is coupled to a common reference voltage, and wherein the biasing transistor is a p-channel transistor.

13. The power harvesting circuit of claim 8 further comprises:
the first start-up current circuit includes a first current boost circuit coupled to the first diode voltage reduction circuit;
the second start-up current circuit includes a native metal oxide semiconductor field effect transistor (MOSFET) coupled to the second diode element; and
the third start-up current circuit includes a second current boost circuit coupled to the third diode voltage reduction circuit.

14. The power harvesting circuit of claim 13, wherein each of the first and second current boost circuits comprises:
a first transistor;
a second transistor; and
a capacitor, wherein gates of the first and second transistors are coupled together, to a first plate of the capacitor, and to a drain of the first transistor, wherein sources of the first and second transistors are coupled to a common reference voltage, wherein a second plate of the capacitor is coupled to a power supply voltage, and wherein a drain of the second transistor is coupled to the first diode voltage reduction circuit.

15. The power harvesting circuit of claim 8 further comprises:
a third p-channel circuit that includes:
a fourth diode element;
a fourth diode voltage reduction circuit coupled to reduce a diode voltage of the fourth diode element; and
a fourth start-up current circuit operably coupled to increase start-up current of the fourth diode element;
a second n-channel circuit that includes:
a fifth diode element;
a fifth diode voltage reduction circuit coupled to reduce a diode voltage of the fifth diode element; and
a fifth start-up current circuit operably coupled to increase start-up current of the fifth diode element;
a third n-channel circuit that includes:
a sixth diode element;
a sixth diode voltage reduction circuit coupled to reduce a diode voltage of the sixth diode element; and
a sixth start-up current circuit operably coupled to increase start-up current of the sixth diode element;
a fourth capacitance circuit;
a fifth capacitance circuit; and
a sixth capacitance circuit, wherein the fourth capacitance circuit is coupled to the first leg of the received RF signal and to the second n-channel circuit, wherein the second n-channel circuit is further coupled to the fifth capacitor circuit and to the third p-channel circuit, wherein the third p-channel circuit is further coupled to the fourth capacitance circuit and to the third n-channel circuit, wherein the third n-channel circuit is further coupled to the sixth capacitance circuit to provide a second output voltage, and wherein the fifth and sixth capacitance circuits are further coupled to the second leg of the RF signal.

16. A wireless device comprises:
an antenna structure operable to receive a radio frequency (RF) signal;
a power harvesting circuit including:
a p-channel circuit that includes:
a first diode element;
a first diode voltage reduction circuit coupled to reduce a diode voltage of the first diode element; and
a first start-up current circuit operably coupled to increase start-up current of the first diode element;
a n-channel circuit that includes:
a second diode element;
a second diode voltage reduction circuit coupled to reduce a diode voltage of the second diode element; and a second start-up current circuit operably coupled to increase start-up current of the second diode element;
a first capacitance circuit coupled to the p-channel circuit and the n-channel circuit; and
a second capacitance circuit coupled to the p-channel circuit and the n-channel circuit;
a processing module;
memory;
a transmitter; and
a receiver, wherein the processing module, the memory, the transmitter, and the receiver are powered by a supply voltage.

17. The wireless device of claim 16, wherein the power harvesting circuit further comprises:
a second p-channel circuit that includes:
a third diode element;
a third diode voltage reduction circuit coupled to reduce a diode voltage of the third diode element; and
a third start-up current circuit operably coupled to increase start-up current of the third diode element; and
a third capacitance circuit coupled to the second p-channel circuit, wherein the second p-channel circuit is further coupled to the n-channel circuit and the first capacitance circuit.

18. The wireless device of claim 17, wherein the power harvesting circuit further comprises:
a third p-channel circuit that includes:
a fourth diode element;
a fourth diode voltage reduction circuit coupled to reduce a diode voltage of the fourth diode element; and
a fourth start-up current circuit operably coupled to increase start-up current of the fourth diode element;
a second n-channel circuit that includes:
a fifth diode element;
a fifth diode voltage reduction circuit coupled to reduce a diode voltage of the fifth diode element; and
a fifth start-up current circuit operably coupled to increase start-up current of the fifth diode element;
a third n-channel circuit that includes:
a sixth diode element;
a sixth diode voltage reduction circuit coupled to reduce a diode voltage of the sixth diode element; and
a sixth start-up current circuit operably coupled to increase start-up current of the sixth diode element;
a fourth capacitance circuit;
a fifth capacitance circuit; and
a sixth capacitance circuit, wherein the fourth capacitance circuit is coupled to the first leg of the received RF signal and to the second n-channel circuit, wherein the second n-channel circuit is further coupled to the fifth capacitor circuit and to the third p-channel circuit, wherein the third p-channel circuit is further coupled to the fourth capacitance circuit and to the third n-channel circuit, wherein the third n-channel circuit is further coupled to the sixth capacitance circuit to provide a second output voltage, and wherein the fifth and sixth capacitance circuits are further coupled to the second leg of the RF signal.

19. The wireless device of claim 16, wherein the power harvesting circuit further comprises:
a second p-channel circuit that includes:
a third diode element;
a third diode voltage reduction circuit coupled to reduce a diode voltage of the third diode element; and
a third start-up current circuit operably coupled to increase start-up current of the third diode element;
a second n-channel circuit that includes:
a fourth diode element;
a fourth diode voltage reduction circuit coupled to reduce a diode voltage of the fourth diode element; and
a fourth start-up current circuit operably coupled to increase start-up current of the fourth diode element; and
a third capacitance circuit coupled to the second p-channel circuit and the second n-channel circuit; and
a fourth capacitance circuit coupled to the second p-channel circuit and the second n-channel circuit, wherein the second p-channel circuit and the second n-channel circuit rectify the received RF signal to produce a second rectified signal and the fourth capacitance circuit filters the rectified signal to produce a second DC output.

* * * * *